United States Patent
Brown et al.

(10) Patent No.: US 11,715,838 B2
(45) Date of Patent: Aug. 1, 2023

(54) FUEL CELL STARTUP/SHUTDOWN DEGRADATION MITIGATION BY REMOVAL OF OXYGEN AD/ABSORPTION MEDIA

(71) Applicant: Intelligent Energy Limited, Loughborough (GB)

(72) Inventors: Max Armstrong Brown, Leicester (GB); Pratap Rama, Leicester (GB); Vincent Gardner, Leicester (GB)

(73) Assignee: Intelligent Energy Limited

( * ) Notice: Subject to any disclaimer, the term of this patent is extended or adjusted under 35 U.S.C. 154(b) by 0 days.

(21) Appl. No.: 17/441,271

(22) PCT Filed: Mar. 19, 2020

(86) PCT No.: PCT/GB2020/050717
§ 371 (c)(1),
(2) Date: Sep. 20, 2021

(87) PCT Pub. No.: WO2020/188278
PCT Pub. Date: Sep. 24, 2020

(65) Prior Publication Data
US 2022/0158206 A1    May 19, 2022

Related U.S. Application Data

(63) Continuation of application No. PCT/GB2020/050717, filed on Mar. 19, 2020.

(30) Foreign Application Priority Data

Mar. 21, 2019  (GB) .................................. 1903887

(51) Int. Cl.
*H01M 8/04*  (2016.01)
*H01M 8/0662*  (2016.01)
(Continued)

(52) U.S. Cl.
CPC ..... *H01M 8/0662* (2013.01); *H01M 8/04022* (2013.01); *H01M 8/04097* (2013.01);
(Continued)

(58) Field of Classification Search
CPC ........... H01M 8/0662; H01M 8/04225; H01M 8/04228; H01M 8/04302; H01M 8/04303
See application file for complete search history.

(56) References Cited

U.S. PATENT DOCUMENTS

2005/0106445 A1    5/2005  Mitchell et al.
2006/0093879 A1*   5/2006  Yang .................. H01M 16/003
                                                          429/432

(Continued)

FOREIGN PATENT DOCUMENTS

CN    101162785 A    4/2008
CN    101911356 A    12/2010
(Continued)

OTHER PUBLICATIONS

International Patent Application No. PCT/GB2020/050717; Int'l Search Report and the Written Opinion; dated Jul. 16, 2020; 14 pages.

*Primary Examiner* — Olatunji A Godo
(74) *Attorney, Agent, or Firm* — Baker Hostetler LLP

(57) ABSTRACT

Aspects of methods and systems to reduce degradation of a fuel cell (110) during start-up and shut-down cycles are disclosed. An anode exhaust stream (201') is periodically directed via fluid communication through an oxygen capture media (86). After shut-down of the fuel cell and before or during start-up said media (86) removes oxygen in the anode exhaust stream. Periodically, heating the oxygen capture media (86) is employed to purge the oxygen collected and regenerate the media.

11 Claims, 5 Drawing Sheets

(51) Int. Cl.
  *H01M 8/04225*  (2016.01)
  *H01M 8/04228*  (2016.01)
  *H01M 8/04302*  (2016.01)
  *H01M 8/04303*  (2016.01)
  *H01M 8/04014*  (2016.01)
  *H01M 8/04089*  (2016.01)

(52) U.S. Cl.
  CPC ... *H01M 8/04225* (2016.02); *H01M 8/04228* (2016.02); *H01M 8/04302* (2016.02); *H01M 8/04303* (2016.02)

(56) References Cited

U.S. PATENT DOCUMENTS

| | | |
|---|---|---|
| 2008/0075986 A1 | 3/2008 | Salvador et al. |
| 2009/0011298 A1* | 1/2009 | Sato .......... H01M 8/04223 48/116 |
| 2011/0159386 A1 | 6/2011 | Kaupert et al. |
| 2012/0077096 A1 | 3/2012 | Krause |

FOREIGN PATENT DOCUMENTS

| | | | |
|---|---|---|---|
| CN | 102437353 | A | 5/2012 |
| JP | 2003-327408 | A | 11/2003 |
| JP | 2004-047160 | A | 2/2004 |
| JP | 2004-288418 | A | 10/2004 |
| JP | 2005-011554 | A | 1/2005 |
| JP | 2005-063733 | A | 3/2005 |
| JP | 2006-351310 | A | 12/2006 |
| JP | 2007-027078 | A | 2/2007 |
| JP | 2007-106612 | A | 4/2007 |
| KR | 2008-0102257 | A | 11/2008 |
| KR | 2011-0139080 | A | 12/2011 |
| KR | 2016-0034589 | A | 3/2016 |

* cited by examiner

FUEL CELL STARTUP/SHUTDOWN DEGRADATION MITIGATION BY REMOVAL OF OXYGEN AD/ABSORPTION MEDIA

This application is the US National Phase of International application No. PCT/GB2020/050717, filed Mar. 19, 2020, titled FUEL CELL STARTUP/SHUTDOWN DEGRADATION MITIGATION BY REMOVAL OF OXYGEN AD/ABSORPTION MEDIA, which claims the benefit of Great Britain 1903887.6, filed Mar. 21, 2019, the contents of which are incorporated by reference herein in their entirety.

TECHNICAL FIELD

The present disclosure relates to fuel cell systems and more particularly to fuel cell systems that prevent or mitigate the degradation of catalyst and catalyst support during fuel cell startup and shutdown.

BACKGROUND

Fuel cells generate electricity by an electrochemical reaction between a fuel gas and an oxidizing gas. The fuel gas is often hydrogen and the oxidizing gas is air. Metals such as palladium and platinum are used as catalysts to cause the electrochemical reaction between the fuel gas and the oxidizing gas.

Today, fuel cell systems rely on catalysts to promote the electrochemical reaction occurring across a membrane or electrolyte. A supporting structure is configured to support the necessary membrane and catalyst. The catalysts serve to increase the surface area for reaction. Often, metal catalysts such as palladium or platinum are used on a catalyst support material, such as carbon. These catalysts need to operate within certain conditions to yield effective reaction rates.

It is widely known that the durability, lifetime, and performance of a fuel cell system s a direct function of the condition of the catalyst and the catalyst support used in the fuel cell system.

Fuel cell performance and lifetime will decrease if catalyst surface area is reduced. If catalyst support structure is degraded or undermined, then the nature and quantity of catalyst available for reaction is impacted. It is also widely known that fuel cell activity that introduces oxygen to the anode compartment of a fuel cell stack through the membrane electrode assembly (MEA) results in an increase in anode and cathode potential leading to carbon support degradation.

Because oxygen is able to diffuse into the anode compartment through the MEA after a fuel cell has been shut down. On startup when hydrogen is introduced a mixed O2+H2 wave front passes across the membrane increasing the localized potential on the anode side of the MEA resulting in the cathode potential increasing to the point where carbon is reduced. This breaks down the carbon supporting the catalyst results in a loss of electrode area.

Strategies such as voltage limiting have been implemented to address such problems. Various strategies to limit the voltage have been implemented/explored. These strategies include introducing inert purge gases during the startup of the fuel cell and imposing an auxiliary load on the fuel cell. Another strategy has been to deplete the oxygen concentration from the system.

In some cases, the amount of catalyst corrosion is improved but has not altogether been eliminated. In other cases, the strategy employed has not decreased the amount of the catalyst support corrosion, particularly carbon.

Despite the aforementioned advantages, fuel cell systems continue to suffer challenges associated with catalyst corrosion.

It is a desideratum, to have a fuel cell configured to not cause catalyst or catalyst support corrosion such that fuel cells are durable, extended life and stable performance. Accordingly, the disclosed system and processes are directed at overcoming one or more of these disadvantages in currently available fuel cell systems.

SUMMARY

In accordance with some aspect of the disclosure, a fuel cell system and method of use is disclosed which include aspects of methods, systems and devices to reduce and/or mitigate the impact of shutdown and startup cycles for a fuel cell system on carbon support and the catalysts supported on said carbon support(s) within the fuel cell system.

For example, during a fuel cell shutdown, air flows to the cathode compartments through the membrane electrode assembly (MEA), thereby introducing oxygen to the anode compartment. Unfortunately, when the fuel cell shuts down oxygen is able to diffuse into the anode compartment through the MEA membrane electrode assembly. Hydrogen fuel gas is then delivered to the anode during fuel cell startup, creating an electrochemical reaction between the existing oxygen and the newly introduced hydrogen to increase the anode potential. The large increase in anode potential raises the cathode potential, which reduces carbon. This higher potential causes catalyst and catalyst support corrosion.

Therefore for applications which require frequent shutdown and startup cycles, the performance of the fuel cell system is significantly impacted.

On startup, when hydrogen is introduced to the fuel cell system because oxygen will migrate from the cathode side of the fuel cell to the anode side a mixture of oxygen and hydrogen initially passes across the membrane increasing localized potential on the anode. This in turn increases the cathode potential to the point that carbon is reduced. This breaks down or reduces the carbon supporting the metal catalysts resulting in a loss of electrode area and the performance of the fuel cell system is significantly impacted.

To protect the support and mitigate corrosion it is important that the anode side of the fuel cell contain near pure hydrogen and little or no oxidant and remain that.

Disclosed herein are some aspects of systems, devices, methods or operation of fuel cell system of the disclosure. The disclosure includes at least one fuel cell, each fuel cell including an anode and a cathode, the anode configured to fluidly receive hydrogen and the cathode configured to fluidly receive an air source containing oxygen; a purification comprising an oxygen scavenging system fluidly connected to an anode outlet configured to receive anode exhaust and remove oxygen from the anode exhaust. wherein the purification unit is configured to reduce the amount of oxygen exiting the purification unit prior to being directed to the anode. In some instances, the purification unit contains a regenerable oxygen capture media configured to at least one of adsorb and absorb oxygen. The oxygen capture media configured to at least one of adsorb and absorb oxygen. In some instances, the media includes an oxygen removing catalyst. In some instances, the oxygen capture media is regenerated by stripping the media with a fluid containing at least hydrogen gas.

In the above described systems, in some instances, heat for regenerating the oxygen capture media is provided by at least one electrical heater. In yet other instances the oxygen capture media is regenerated by heating the media with a catalytic heater element configured to combust hydrogen gas. In some instances, the catalytic heater element is in thermal communication with the purification unit.

In the above described systems, in some instances, the catalyst contains at least one member of the group consisting of palladium, platinum, ruthenium, rhodium, osmium, iridium gold, silver, rhenium, iron, chromium, cobalt, copper, manganese, tungsten, niobium, titanium, tantalum, lead, indium, cadmium, tin, bismuth and gallium. In some instances, the selected catalyst or alloy forming the catalyst is configured to combust hydrogen at temperatures as low 0° C. In some instances, the selected catalysts or alloy forming the catalyst is configured to combust hydrogen at temperatures as low −30° C.

Disclosed herein are some aspects of systems, devices, methods or operation of fuel cell system to reduce degradation of a fuel cell during start-up and shut-down cycles of the disclosure including fluidly connecting the anode exhaust stream from a fuel cell to an absorption module containing an oxygen capture media; after shut-down and at least one of before and during start-up removing oxygen in the anode exhaust stream by way of the oxygen capture media; and, directing the anode exhaust downstream of the absorption module to the anode fuel inlet prior to start-up; and, wherein the downstream exhaust stream has the oxygen content reduced. In some instances, the oxygen capture media is a catalyst which can be regenerated to releases absorbed oxygen when sufficiently heated. In some instances, the method includes thermally connecting an anode off-gas burner to the oxygen capture media configured to provide heat to said media; and, combusting hydrogen within the anode off-gas burner to heat said media. In some instances, the sources of hydrogen for combustion include one or more of the anode exhaust stream, the hydrogen fuel source and recirculated hydrogen within a recircularization loop. In some instances, the method includes fluidly connecting a gaseous stream containing released oxygen into the anode off-gas burner; and, releasing the oxygen as water vapor and exhaust.

at least one fuel cell having an anode side and a cathode side, the anode side configured to fluidly receive hydrogen gaseous fuel supply and the cathode side configured to receive an air source containing oxygen. An oxygen scavenging system is in fluid communication with an anode outlet comprising an anode off gas burner having an inlet and outlet configured to remove hydrogen from the anode exhaust and generate heat from combusting said hydrogen having an absorption module containing an oxygen absorbent media. The absorption module is fluidly connected to the anode exhaust and, the oxygen scavenging system is configured to reduce the amount of oxygen in the hydrogen fuel supply during start-up prior to being directed to the anode flow field. In some instances, the absorbent media is an oxygen removing catalyst which may also contain nickel and/or carbon. In some instances, the absorbent media can be regenerated after being loading with oxygen. In some instances, at least one catalytic heater within the anode off-gas burner is configured to combust hydrogen. In some instances, a controller selectively opens and closes valves to control fluid flow in the system.

Disclosed herein are some aspects of systems, devices, methods or operation of fuel cell system of the disclosure. The disclosure includes at least one fuel cell having an anode side and a cathode side, the anode side configured to fluidly receive hydrogen gaseous fuel supply and the cathode side configured to receive an air source containing oxygen. An oxygen scavenging system is in fluid communication with an anode outlet comprising an anode off gas burner having an inlet and outlet configured to remove hydrogen from the anode exhaust and generate heat from combusting said hydrogen having an absorption module containing an oxygen absorbent media. The absorption module is fluidly connected to the anode exhaust and, the oxygen scavenging system is configured to reduce the amount of oxygen in the hydrogen fuel supply during start-up prior to being directed to the anode flow field. In some instances, the absorbent media is an oxygen removing catalyst. In some instances, the absorbent media can be regenerated after being loading with oxygen. In some instances, at least one catalytic heater within the anode off-gas burner is configured to combust hydrogen. In some instances, the catalyst contains at least one member of the group consisting of palladium, platinum, ruthenium, rhodium, osmium, iridium gold, silver, rhenium, iron, chromium, cobalt, copper, manganese, tungsten, niobium, titanium, tantalum, lead, indium, cadmium, tin, bismuth and gallium. In some instances, platinum, palladium, rhodium and combinations and alloys thereof are preferred as the catalytic material. In some instances, the selected catalysts or ally forming the catalyst is configured to combust hydrogen at temperatures as low 0° C. In some instances, the selected catalysts or ally forming the catalyst is configured to combust hydrogen at temperatures as low −30° C.

Disclosed herein are some aspects of systems, devices, methods or operation of fuel cell system to reduce the degradation of the fuel cell components and/or operation during start-up and shut-down cycles including fluidly connecting the anode exhaust stream from a fuel cell to an absorption module containing an oxygen absorption media; during shut-down and before start-up removing oxygen in the anode exhaust stream which migrated from the cathode gallery of flow distribution channels of a fuel cell to the anode gallery of flow distribution channels between shut-down and start-ups of the fuel cell system by way of the oxygen absorption media; and, directing the anode exhaust downstream of the oxygen absorption-desorption media to the anode fuel inlet prior to start-up. In some instances, the oxygen absorption-desorption media is a catalyst which can be regenerated to releases absorbed oxygen when sufficiently heated.

Disclosed herein are some aspects of systems, devices, methods or operation of fuel cell system to reduce the degradation of the fuel cell components and/or operation during start-up and shut-down cycles including fluidly connecting the anode exhaust stream from a fuel cell to an absorption module containing an oxygen absorption media; during shut-down and before start-up removing oxygen in the anode exhaust stream which migrated from the cathode gallery of flow distribution channels of a fuel cell to the anode gallery of flow distribution channels between shut-down and start-ups of the fuel cell system by way of the oxygen absorption media; and, directing the anode exhaust downstream of the oxygen absorption-desorption media to the anode fuel inlet prior to start-up. In some instances, the method includes thermally connecting an anode off-gas burner to the oxygen absorption-desorption media configured to provide heat to said media; and, combusting hydrogen within the anode off-gas burner to heat said media. In some instances, fluidly connecting a gaseous stream containing released oxygen into the anode off-gas burner; and, releasing the oxygen as water vapor and exhaust.

Disclosed herein are some aspects of systems, devices, methods or operation of fuel cell system to reduce the degradation of the fuel cell components and/or operation during start-up and shut-down cycles including fluidly connecting the anode exhaust stream from a fuel cell to an absorption module containing an oxygen absorption media; during shut-down and before start-up removing oxygen in the anode exhaust stream which migrated from the cathode gallery of flow distribution channels of a fuel cell to the anode gallery of flow distribution channels between shut-down and start-ups of the fuel cell system by way of the oxygen absorption media; and, directing the anode exhaust downstream of the oxygen absorption-desorption media to the anode fuel inlet prior to start-up. In some instances, the method includes scrubbing hydrogen from the anode exhaust via passing said exhaust through the anode off-gas burner. In some instances, the method includes combustion hydrogen in the anode exhaust via a catalytic heater in the anode off-gas burner to regenerate the oxygen absorption-desorption media between start-up and shut-down of the fuel cell system. In some instances, a controller selectively opens and closes valves to control the fluid flow from the anode outlet.

DRAWINGS

The above-mentioned and other features and advantages of this disclosure, and the manner of attaining them, will become apparent and be better understood by reference to the following description of one aspect of the disclosure in conjunction with the accompanying drawings, wherein.

FURTHER DESCRIPTION

The present disclosure provides a fuel cell system for preventing or mitigating the degradation of catalyst and catalyst support during fuel cell startup and shutdown processes. An oxygen absorption-desorption scheme and device is disclosed as a stand-alone unit and within a fuel cell system. The removal of oxygen from the anode's fluid connection to the fuel system upon start up reduces potential spikes at the anode and cathode side of the fuel cell plate(s) and reduces/mitigates corrosion of carbon support therein and reduction of catalyst and/or area for support of catalysts.

System Overview

Figure 1:
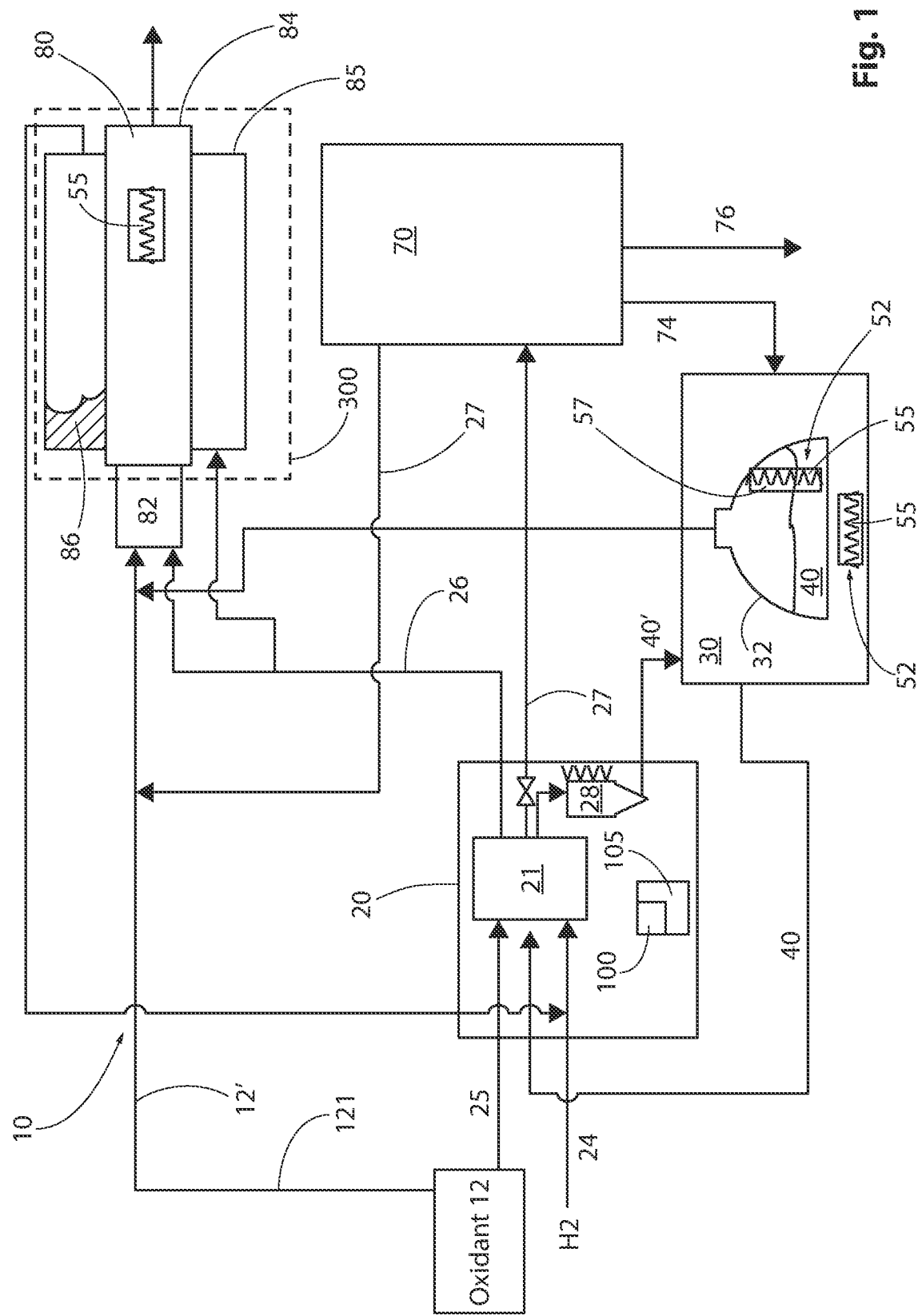
FIG. 1 shows aspects of a system and method of operation of a fuel cell power system of the present disclosure configured to mitigate or reduce degradation of catalyst during operation.

FIG. 1 is schematic showing some aspects of a fuel cell system 10 including a fuel cell assembly 20 and a coolant storage module 30. The disclosure includes operation of a fuel cell power system configured to mitigate or reduce degradation of catalyst during operation.

The fuel cell assembly 20 includes one or more fuel cell stacks 21 including a plurality of proton exchange membrane fuel cells stacked together and the balance of plant BOP (not shown) including pumps, valves, fans, controllers and circuitry and the like which are well known in the art. The fuel cell assembly 20 shown is an evaporatively cooled fuel cell assembly. In this example, the coolant comprises water, although it will be appreciated that other coolants could be used such as glycol, water or other or aqueous solutions. The coolant or water storage module 30, in this example, stores pure water for the hydration and/or evaporative cooling of the fuel cell assembly 20. The coolant storage module 30 includes a coolant storage tank 32 to hold the coolant supply 40.

The fuel cell assembly 20 and stack(s) within are configured to receive fuel and oxidant. FIG. 1B show a schematic view of an array or grouping of fuel cell stacks 21 and 21' within a single fuel cell assembly 20.

The fluid flow of fuel, such as hydrogen, is to the anode through an anode inlet 24 and a fluid flow of oxidant, such as air, to the cathode through a cathode inlet 25. An anode exhaust 26 is provided to allow for through flow of the fuel. A cathode exhaust 27 is provided to allow for through flow of the oxidant. It will be appreciated that the exhaust flows also carry some reaction by-products and any coolant/hydration liquid that may have passed through the assembly 20. The cathode exhaust 27 may include a coolant separator 28 to separate the produced water and coolant (water) 40' from the cathode exhaust flow. The separated water is stored in the coolant storage module 30. It will be appreciated that while this example shows the recycling of water (coolant) that has passed through the stack, this disclosure is applicable to systems that do not recycle coolant or recycle coolant in a different way. The air from the cathode exhaust 27 may be provided to the compressor 82 for use in an anode off gas burner (AOBH).

The coolant storage module 30 is fluidly connected to the fuel cell assembly by conduits, although it will be appreciated that the module 30 may be integrated with the fuel cells in the stack. The coolant storage module 30 is connected to the cathode inlet 25 to allow for the introduction of coolant into the cathode flow for evaporative cooling of the fuel cell assembly 20. The coolant may be introduced to the stack by a separate conduit.

The coolant storage module 30 may comprise a plurality of coolant storage tanks Compressors drive oxidant through the fuel cell assembly can get warm relatively quickly after start-up of the fuel cell assembly and therefore moving heat from the compressors within the oxidant (air source) 12 to the coolant storage module using a heat exchanger and working fluid and/or heat pipe (fluid connection) in some instance the waste heat may be utilized to drive, at least in part, an anode off-gas burner. A coolant injection/flow controller 100 may form part of a fuel cell system controller 105 for controlling further operations of the fuel cell system.

Catalytic Heater

The fuel cell system 10 includes at least one catalytic heater 52 that burns a combustion fuel by the catalysis of a combustion catalyst. The catalytic heater may be used to meet the heating demands of the system 10 in different ways. Traditional fuel cell systems have used electric heaters. Electric heaters, however, have disadvantages as noted including but not limited to battery drain and other parasitic losses.

The catalytic heater 52 includes one or more catalytic heating elements 55. The catalytic heater 52 may provide a housing 57 to contain the catalytic heating elements 55. The catalytic heating elements 55 include catalytic material for combustion. The catalytic material may be supported on a substrate. A variety of different structures for the catalytic heater 52 and catalytic heating elements 55 are contemplated by the disclosure.

Preferably, the catalytic heater 52 is independent of the fuel cell assembly 20. An independent catalytic heater 52 is able to continue to operate while the fuel cell assembly 20 is shutdown. This feature is particularly advantageous because the coolant temperature is maintained and not a function of the fuel cell operation. If the catalytic heater 52 is not independent of the fuel cell assembly, then the fuel cell start-up may be delayed in sub-zero operating ambient conditions.

Catalytic Materials

The above implementations detail the use of catalytic heaters, those heaters may be constructed of a number of different materials. A non-exclusive list of suitable catalytic materials includes metals. The following metals may function as a catalytic material: palladium, platinum, ruthenium, rhodium, osmium, iridium gold, silver, rhenium, iron, chromium, cobalt, copper, manganese, tungsten, niobium, titanium, tantalum, lead, indium, cadmium, tin, bismuth and gallium, among others, as well as compounds and alloys of these metals. In one aspect of the present disclosure, platinum, palladium, rhodium and combinations and alloys thereof are preferred as the catalytic material. In another aspect of the present disclosure, the catalytic material is preferably palladium. Other suitable catalytic materials and metals are generally known to the skilled artisan and/or one of ordinary skill in the art.

The catalytic material preferably spontaneously combusts the fuel source for the fuel cell system (i.e., hydrogen gas) at relatively low temperatures. For example, in some aspects of the disclosure, the catalytic material may combust hydrogen gas at temperatures as low as 0° C. or even as low as −30° C. It may also be useful to select a catalytic material that combusts hydrogen gas safely without an open flame over a broad range of temperatures, including from relatively low temperatures to relatively high temperatures.

The catalytic material is preferably able to induce combustion using relatively low concentrations of hydrogen. In one aspect of the present disclosure, the catalytic heater is configured to combust the hydrogen gas present in the anode exhaust stream. The hydrogen concentration in the anode exhaust stream is relatively low when the fuel cell assembly is operating at a steady state condition. For example, the hydrogen concentration of the anode exhaust may be as low as 1%. The anode exhaust is described in further detail below. Alternatively, the catalytic heater may receive hydrogen gas directly from the hydrogen source. This may be beneficial to the fuel cell system in certain circumstances.

Preferably, the hydrogen gas is pre-mixed with air prior to being introduced to the catalytic heater. The supplied air may be provided by the same air source used for the fuel cell assembly. In this case, the air inlet to the cathode flow field in the fuel cell assembly is fluidly connected to the catalytic heater. Alternatively, the supplied air may be provided from a source separate from the air source for the fuel cell assembly. Fans may be used to direct the air to the coolant module and the catalytic heater, A mixing chamber may be provided upstream of the catalytic heater to mix the supplied air and hydrogen gas. The hydrogen gas mixture is then directed to the catalytic heater where the gas mixture comes in direct contact with the catalytic material thereby triggering the catalytic combustion reaction. The amount of heat generated by the catalytic combustion reaction is largely dependent on the catalytic material, hydrogen concentration in the gas mixture and the flow rate of the gas mixture to the catalytic heater. In some aspects, the gas mixture contains an air to hydrogen ratio of Min:34:1 (by mass)—stoichiometric ratio; Max:180:1 (by mass).

Catalytic materials that permit hydrogen to burn at sub-zero temperatures, however, are particularly advantageous for fuel cell systems operating in colder climates. Platinum-group metals are particularly effective in this regard.

Substrate Support

The catalytic material may be supported on a substrate. For example, the catalytic material may be deposited or coated on a substrate of suitable geometric surface area using methods well known to the skilled artisan and/or those of ordinary skill in the art. Suitable substrates may include, but are not limited to, metals, ceramic materials, and a combination thereof. The substrate may be a porous or foamed material such as a ceramic foam or foamed metal. The substrate may also include structures such as foils, plates, wires, wire meshes, honeycombs, etc. or a combination thereof. The substrate material may assist with dispersing the heat generated by the catalytic combustion of the fuel source.

Exhaust Mediation

The fuel cell system 10 shows an anode off-gas burner 84 which is configured to at least one of purify anode exhaust and scrub the anode exhaust vi removal of hydrogen therein. Particularly in the automotive application, emission standard may strictly limit ppm of hydrogen in an exhaust stream. The system is fluidly connected to the air source 12, the fuel cell assembly 20 and may also be connected to a coolant module 30. The exhaust system includes a compressor 82 and the anode off-gas burner heater (AOBH) 84. The AOBH may be a catalytic heater 52 as previously described. The exhaust module receives hydrogen gas within the anode exhaust stream and combusts the hydrogen generating heat which may be one or more of exhausted from the system, used for additional applications such as turbine produced electrical power, recycled and used for coolant thawing and regeneration of oxygen scavenging media. The removal of hydrogen from the anode exhaust may also be referred to as "scrubbing".

Thermal Module

A thermal module 70 is configured to recover water from the cathode exhaust and said water can be added to a coolant storage module 30 via a primary water outlet 74 fluidly connected thereto. The cathode exhaust 76 is shown exiting the thermal module.

The compressor 82 is fluidly connected to the system and may receive air directly from the air source 12. An oxidant stream 12' and/or exhaust air 27' passes through the fluid connection via a fan or compressor 82 whereby it is pressurized. The feed from the compressor is provided to the off-gas burner 84. The off-gas burner both diminishes the hydrogen ppm in the exhaust stream and when placed in thermal communication with the absorption module 85 the otherwise lost heat from off-gas combustion is captured and provided to regenerate the oxygen capture media 86 packed in the adsorbent/absorption module 85. The module may be referred to as a purification unit. In adsorption/absorption mode it removes oxygen from the outlet stream used to supply hydrogen to the anode. The oxygen capture media also referred to as oxygen scavenger must be periodically regenerated to remove oxygen captured thereby. Although the term absorbent is used throughout the specification, depending on the media, operating environment and the like the actual process taking place at the chemical level may include adsorption and well as or in lieu of absorption. In this exemplar the purification unit is configured as being integral with an anode off-gas burner heater (AOBH) which provides heat to regenerate the oxygen absorption-desorption media 86 (which may also be referred to as the oxygen capture, oxygen absorption, oxygen adsorption or oxygen absorbent media) forming an oxygen mitigation system 300. That coupling is preferred as a thermal connection to provide heat to the media is necessary to regenerate the media. Physical coupling may be advantageous in some instances but is not required in all instances. Regeneration is accomplished by utilizing hydrogen in the cathode output stream 26 or by adding hydrogen to the fluid stream entering into the exhaust compressor 82. By heating the oxygen absorbent media 86 sufficiently oxygen and hydrogen form water and regenerate the media. The water is carried out of the oxygen absorbent media 86 as water vapor in the gas stream.

The oxygen absorbent media 86 is periodically regenerated during fuel cell operation. At start-up, the anode will contain oxygen which has migrated into the anode and operating (starting up) the fuel cell with such oxygen present will be damaging by corroding the cathode support by raising the cathode potential and thereby oxidizing same which in turn degrades said support and reduces the membrane surface area. Stripping the oxygen capture media with hydrogen fluid flow may be part of the regeneration.

The anode off-gas burner may be surrounded with the absorption material and the absorption module functions to remove oxygen from the portion of the anode exhaust stream fluidly connected therewith and provide fuel with reduced oxygen for start-up of the fuel cell stack.

FIGS. 2A-2D shows aspects of a system and method of operation of a fuel cell power system of the present disclosure configured to mitigate or reduce degradation of catalyst during operation.

The system and method of operation 108 is shown is a simplified overview of some aspects of the system and method. The disclosed system is configured to reduce degradation of catalyst support structures within the fuel cell stack 110 by mitigating or addressing oxygen in the system which can diffuse across the fuel cell membrane during shut-down cycles of operation of the fuel cell. The diffuse migration is from the cathode side to the anode side. Left unmitigated the oxygen is damaging to the system. The oxygen will corrode and reduce the carbon support for the catalyst within the fuel cell during start-up. Aspects of a start-up include the fuel cell stack receiving hydrogen fuel direct into the anode and an oxidant into the cathode. Aspects of the shut-down process is when the fuel cell stack no longer produces electricity and no longer receives fuel.

During a fuel cell shutdown, oxygen is unavoidably present in the fuel cell system. The primary source of the oxygen present in the system originates from the outlet to the cathode flow field. Because the cathode is supplied with an air source that reacts with the hydrogen fuel gas, the cathode outlet introduces air-containing oxygen to the fuel cell system and the anode flow field. The air introduced to the system represents unreacted reactants or oxygen. The oxygen then travels across the MEA and increases the potential and the pressure. Hydrogen's potential is ~0V RHE on the anode side 120 on a fuel cell and on the cathode side 115 oxygen's potential is ~1V RHE (1.23V theoretically) giving at least a 1V potential difference at open circuit voltage. The anode side 115 is fluidly connected to an anode inlet 116 and to an anode outlet 117. The anode side 115 may also be configured to provide a gallery of flow distribution channels 115' with surface features, including but not limited to bumps, divots, channels, and walls to direct, diffuse or otherwise effect the laminar flow through the anode side.

The cathode side 120 is fluidly connected to a cathode inlet 121 and to a cathode outlet 122. The cathode side 120 may also be configured to provide a gallery of flow distribution channels 120' with surface features to direct, diffuse or otherwise effect the laminar flow through the anode side.

During an unmitigated start-up a mixture of air and hydrogen is present in the anode side which moves through as a fluid with an initial "wave front" (as air is purged from the anode by the incoming hydrogen) at the wave 'front' the gas mixture can raise the localized anode potential up 0.5V moving across the electrode surface. The cathode side having only air (containing oxygen) has ~1V (1.23V theoretically) potential so to maintain a 1V differential on the cathode side, carbon begins to oxidize into CO & CO2 which has a higher oxidation potential. When the cathode potential raises up above 1.4V the carbon corrosion rate increases significantly. Accordingly, the carbon support that holds the platinum (catalyst) is oxidized, effectively lowering the platinum surface area as it is no longer bound to the electrode. To mitigate the above problem(s) an oxygen absorption media device, system and method is configured to remove oxygen from the anode exhaust stream before hydrogen in the exhaust stream is redirected or recirculated back into the anode inlet (116). The anode exhaust downstream of the absorption module will contain anode exhaust that has had oxygen ameliorated therefrom and therefore mitigated. That systems operates by way of an absorption or oxygen capture media which has limited capacity without regeneration and therefor will requires regeneration to have use in an operating system. Regeneration is accomplished by the addition of sufficient heat to release scavenged oxygen. Thermally connecting the AOBH with the absorption module 85 provides the additional benefit of utilizing a system loss to provide energy for the regeneration of the absorption media.

Main aspects of a system 108 includes a fuel cell 110, a hydrogen fuel supply 200, an oxygen mitigation system 300, an air supply (oxidant) 400, a coolant supply 500 and water 600 produced during operation of the fuel cell. The fuel cell has one or more plenums 112 which provides a gallery of flow distribution channels to distribute hydrogen 200 and oxidant 400 to the plurality of bipolar plates therein. The cathode side 115 of a plate receives oxidant 400 and the anode side receives hydrogen 200, the MEA 125 separates the two sides. The MEA contains a carbon support and supports catalyst as previously disclosed. For the sake of brevity coolant supply flow is not further detailed.

Additional aspects of system and method of operation include:

A. Hydrogen Supply: A hydrogen fuel supply 200 the hydrogen fluidly connected 201 to a fuel cell 110 wherein it flows through the anode side of the stack. The anode outlet flow 201' is fluidly connected to the system and may be part of a recircularization loop. The fluid pathways to the fuel cell stack includes a first valve 202 a gas injector valve 204, a passive ejector valve 206 a second valve 208, A first three-way solenoid valve 210, a second three-way solenoid valve 212, a condenser 214 and a separator 216 to remove water. The condenser 214 may be used for temperature control of the gas stream existing the oxygen mitigation or scavenging system 300 also sometimes referred to generally as the AOBH. The hydrogen loop also may have a pump 218, a connection orifice 220 and third valve 222 and a connection 225 to the air supply 400 to provide hydrogen to heat the oxygen mitigation system 300 which is configured to contain oxygen absorption media 86 such as, copper, zinc oxide or nickel-based fine powder absorbent. Though it will be noted that any material which spontaneously absorbs oxygen may be used with the majority of candidate materials being metals, metal oxides or alloys thereof.

The third valve 222 is closed except during regeneration mode. The absorption module 85 contains media 86 which requires regeneration for continued operation. The AOBH has an inlet 305 which is fluidly connected to the recirculation loop whereby oxygen released during regeneration of the oxygen absorption media can be exhausted via an outlet 307 to. An air supply 401 is fluidly connected to the inlet 305.

During absorption and oxygen mitigation the anode exhaust inlet 308 is fluidly connected to the oxygen absorption media 86 within the absorption module 85, the anode exhaust stream prior to start-up will contain oxygen which has migrated from the cathode and if left unmitigated would be harmful to the fuel cell. The media 86 within the oxygen mitigation module which may be a part of the AOBH absorbs oxygen from the stream. The mitigated, polished or otherwise oxygen reduced anode exhaust stream is, shown in a non-limiting example, within the AOBH and is fluidly connect out of the AOBH via the anode exhaust outlet 309. The anode exhaust may be in a recirculating loop to purge oxygen from the fluid stream.

The media may be any material that is capable of either adsorbing or absorbing oxygen from the anode gas source. The media may in any form that is suitable to make sufficient contact with the anode gas source passing through the oxygen scavenging system (also a type of purification unit). Similarly, the purification unit may include any apparatus or device that is capable of containing the media and providing acceptable or sufficient exposure of the media to the oxygen containing anode source to yield a substantially oxygen free gas stream or a nitrogen-rich gas stream. To regenerate the media one or more heating means are thermally connected to the oxygen mitigation system (which although not shown separately is not required to be embedded within the AOBH) is configured to provide sufficient heat to cause the media 86 to release the oxygen captured thereby. The means include, but is not limited to, catalytic heaters 52, waste heat from the system, other chemical or electrical heating elements. In some instances, the oxygen scavenging system 300 includes an AOBH in thermal communication with the media 86.

In some instances, the anode flow 201' is fluidly connected to the AOBH Regen inlet 305 at connection 225 upstream of the hydrogen recirculation loop. In some instances, the hydrogen supply 201 fluidly connected to the AOBH may be fluidly connected from the hydrogen recirculation loop but downstream of any condensation and water separation. Optionally, the gas exhausted from the Regen outlet 307 may be fed to a gas expansion stage (not shown) to recover mechanical energy.

Three-way solenoid vales 210 and 212 are controlled by the controller 105 to modulate flow from the oxygen scavenging system 300 and/or the AOBH inlets and outlets during absorption and regeneration. During regeneration the controller maintains a minimum predetermined required flow rate through the media 86 to remove the oxygen Three-way solenoid vales 210 and 212 and other valves may also be modulated by the controller to minimize the trapped volume on shut-down. Three-way solenoid vales 210 and 212 and other valves may be modulated by the controller 105 to isolate the AOBH absorber side when the system is in the 'off' state. Three-way solenoid valves 210 and 212 and other valves are modulated by the controller to isolate the AOBH during normal fuel cell operation.

B. Oxidant Supply: An air (oxidant) supply 400 is fluidly connected 401 to the fuel cell 110 wherein it flows through the cathode side of the stack. The air supply 400 is also fluidly connected to oxygen absorption/scavenging system 300 whereby it may provide air and hydrogen via a fluid connection to a catalytic heating element 55 (shown in FIG. 1) within the scavenging system 300.

C. Coolant Supply: Optionally a coolant supply 500 is fluidly connected 501 to the fuel cell 110 wherein it flows through and cools the stack. The coolant supply is also shown cooling the passive condenser 350 which is part of the water scavenging system of the balance of plant for the fuel cell system and operational method disclosed herein. The separator 216 is connected to a fluid connection 601 for collecting scavenged or reclaimed water from the fuel streams and the flow of which may be controlled via a first water supply valve 602.

The fundamental problem being addressed via the oxygen mitigation or scavenging is to remove oxygen from the anode side of the fuel cell between shut-down and start-up. During shut-down, as previously disclosed, oxygen will migrate across the membrane thereby setting up increased voltage potential on either side of the carbon support for the plates within the fuel cell. Left unmitigated the potential variances will cause corrosion the carbon support. The oxygen scavenging system is used prestart-up of the fuel cell for a fixed or variable time frame. The time frame may be provided by a look-up table (LUT) or a controller (not shown) which measures time off, and/or data from one or more sensor measurement of pressure, temperature, gas constituents to determine the time to flow the anode fuel fluid connection through the oxygen scavenging system 300. In some instances, the flow time of the anode side fuel through the oxygen scavenging system is between 10 and 90 seconds. In other instances, the time is between 20 and 70 seconds, in other instances the time is between 30 and 60 seconds. In yet other instances the time is 60 seconds, in yet other instances the time is less than 60 seconds and in yet other instances the time is greater than 60 seconds. After absorption of the is completed the oxygen absorption media 86 requires regeneration. The regeneration cycle includes heating the oxygen absorption media to a predetermined temperature whereby the absorbed oxygen is released. The oxygen scavenging system 300 may be fluidly connected to a condenser and separator whereby oxygen is combined with hydrogen to form water which is fluidly connected via the water removable line 601 and the remaining substantially oxygen free or a nitrogen-rich gas stream may be returned to the anode hydrogen fuel supply fluid connection 201.

Figure 2A:
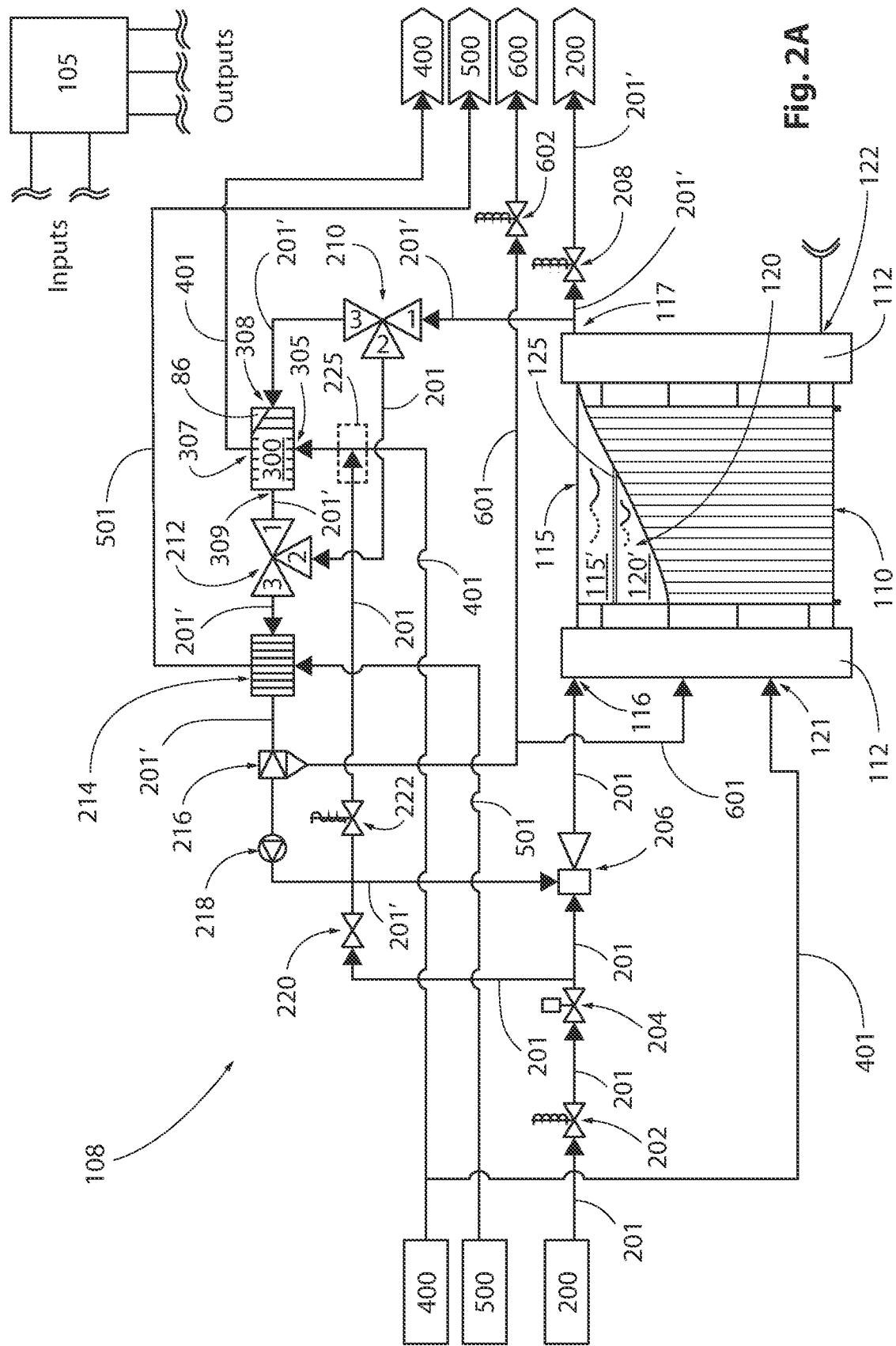
FIG. 2A shows aspects of a system and method of operation of a fuel cell power system of the present disclosure configured to mitigate or reduce degradation of catalyst during operation.
Figure 2B:
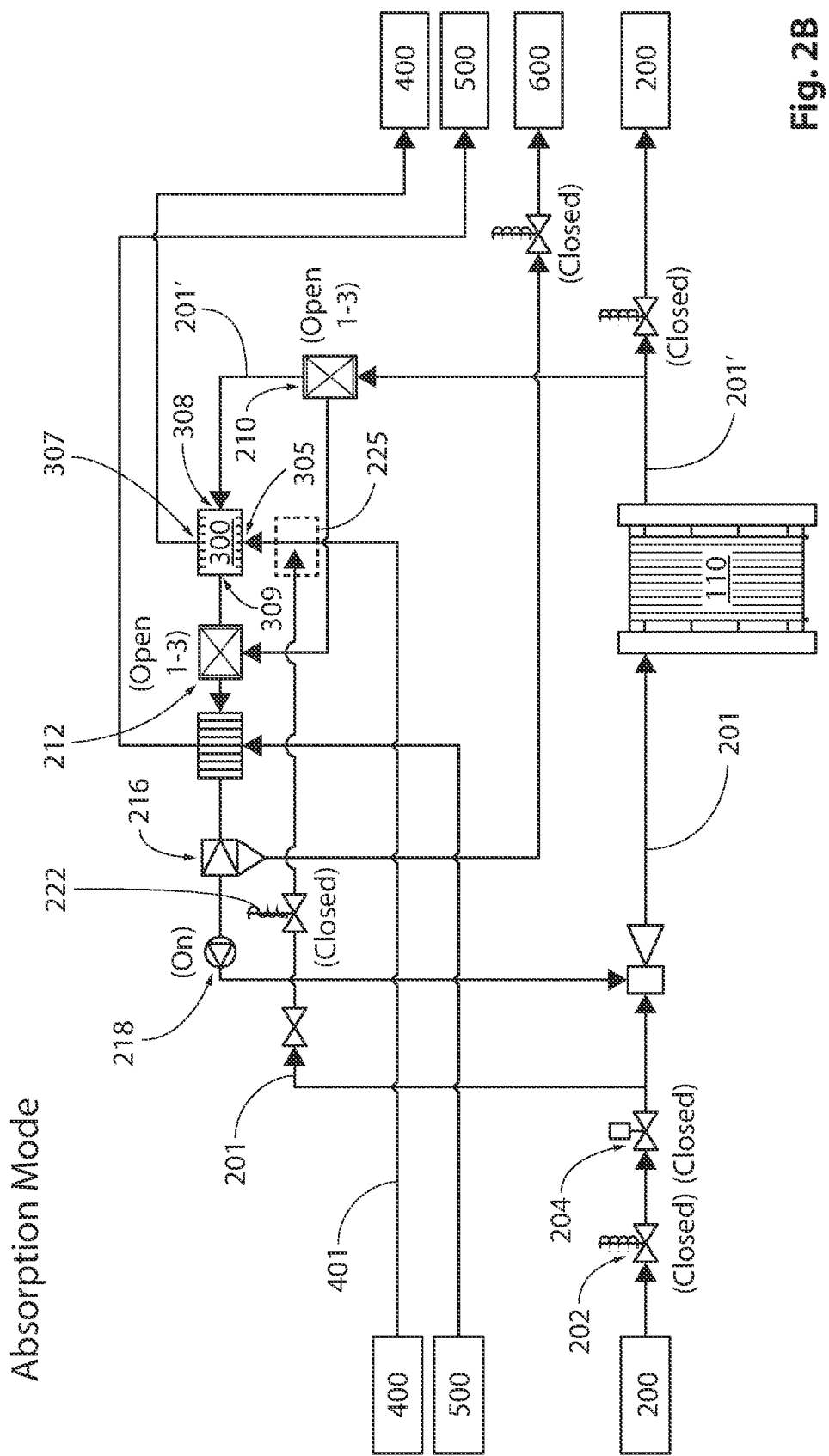
FIGS. 2B through 2D illustrate aspects of operation of the system and method in several modes related to the regeneration of oxygen mitigation media.

Aspects of the absorption phase are illustrated in FIG. 2B. The fuel cell 110 is off-load the anode flow 201' will contain oxygen which has migrated from the cathode side of the fuel cell to the anode side. To avoid the voltage spikes which corrode the carbon support therein, the gas injector 204, second valve 208, third valve 222 and the first three-way solenoid valve 210 are configured to direct the anode flow 201' to the anode exhaust inlet 308 inlet of the AOBH. The anode flow 201' exist the AOBH through the anode exhaust outlet 309 after the absorption media polishes, cleans, scavenges or otherwise reduces the oxygen within the anode exhaust.

Figure 2C:
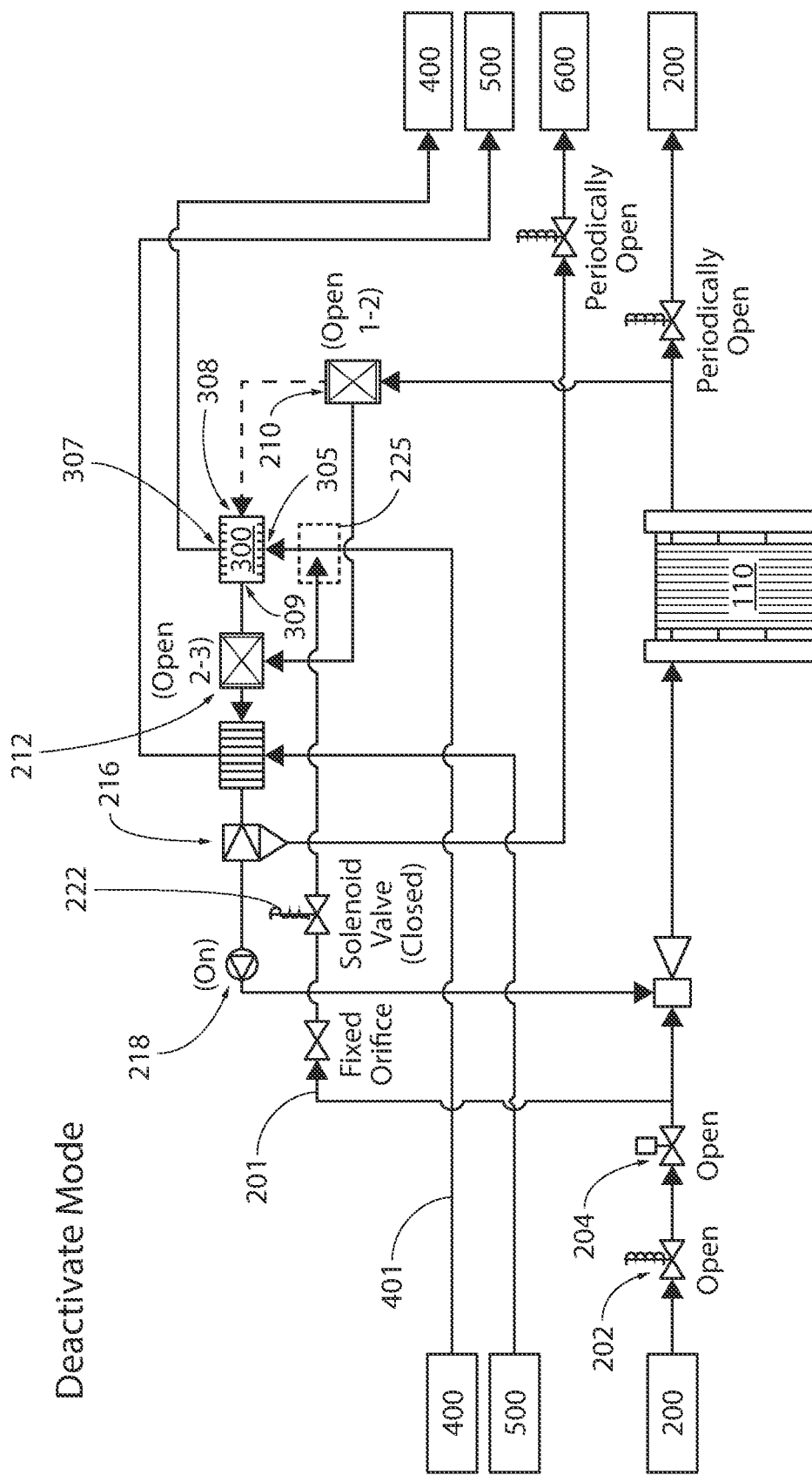

Aspects of the de-active or neutral phase are illustrated in FIG. 2C. The fuel cell 110 is on-load the anode flow 201' will contain little or no oxygen and the second valve 208 and the first three-way solenoid valve 210 are configured to direct the anode flow 201' to avoid the AOBH.

Figure 2D:
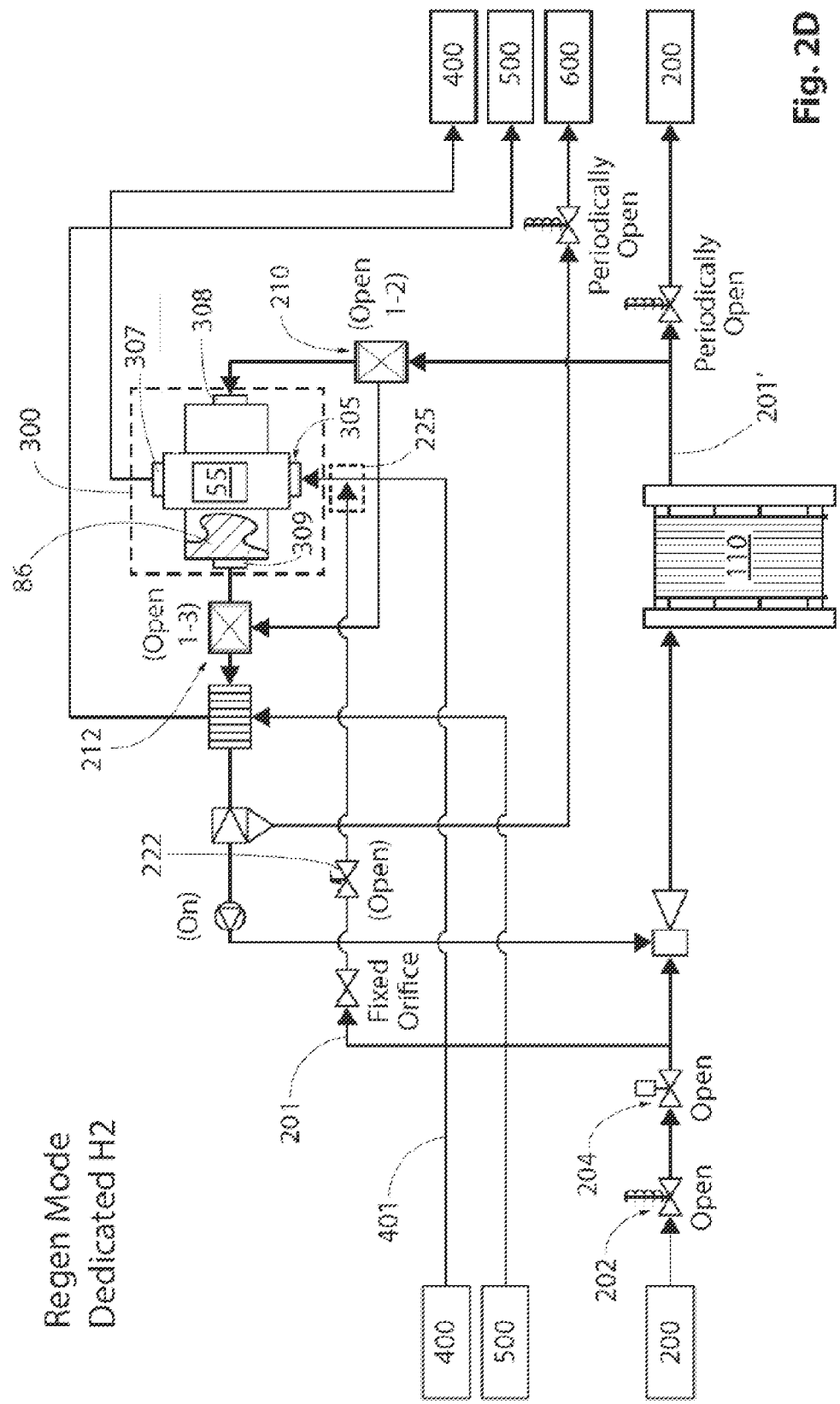

Some aspects of a simplified regeneration phase are illustrated in FIG. 2D. The fuel cell 110 is on-load the anode flow 201' will not contain significant amounts of hydrogen the gas injector 204, second valve 208, third valve 222 and the first three way solenoid valve 210 are configured to direct the anode flow 201' The first three way solenoid valve 210 is open in the 1-3 configuration and the third valve 222 is open therefore during the regeneration cycle, absorbed oxygen is released and evacuated via anode exhaust gas as the carrier gas. The AOBH is heated to sufficiently to thermally transfer sufficient heat to the media 86 within absorption module 85 to release the stored oxygen. The air supply 401 is fluidly connected to the (Regen) inlet 305 and also receive hydrogen 201 via connection 225 whereby the air and hydrogen pass through the media 86 combining the hydrogen with the released oxygen producing water vapor which is exhausted from outlet 307.

Aspects of another Regen process with greater temperature fluctuations include lower temperature start-ups of about 15 degrees C. However, during operation temperatures of about 80 degrees C. are expected. At start-up lower pressures will be the normal state because the volumetric flow of reactants through the system is also low. Conversely, at higher operating temperatures there will be a greater volumetric flow through the fluid connection of the system. The system detailed in FIG. 2D is configured to accommodate these varying conditions during operation. The pressure on each of the cathode side and the anode side of the system should be generally the same between about 1 and 2 bara to avoid degradation of the fuel cell stack. Additionally, during operation the system may be pressured to as high as 3 bara when operating under hotter ambient conditions which in turn will aid with heat rejections.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

The invention claimed is:

1. A fuel cell system comprising:
at least one fuel cell, each fuel cell including an anode inlet and a cathode inlet, wherein the anode inlet is configured to fluidly receive hydrogen and the cathode inlet is configured to fluidly receive an air source containing oxygen; and
a purification unit fluidly connected between an anode outlet of the at least one fuel cell and the anode inlet;
wherein the purification unit is configured to reduce the amount of oxygen in an anode exhaust stream exiting the anode outlet prior to the anode exhaust stream being directed to the anode inlet, the reduction being performed after shut-down, before start-up and during the startup; and,
wherein the purification unit contains a regenerable oxygen capture media configured to at least one of adsorb and absorb oxygen; and,
wherein the oxygen reduction before start-up reduces the cathode potential and decreases the instances of the cathode potential rising above 1.4V whereby carbon corrosion of platinum catalyst support is significantly reduced.

2. A fuel cell system comprising:
at least one fuel cell, each fuel cell including an anode inlet and a cathode inlet, wherein the anode inlet is configured to fluidly receive hydrogen and the cathode inlet is configured to fluidly receive an air source containing oxygen; and
a purification unit fluidly connected between an anode outlet of the at least one fuel cell and the anode inlet;
a recirculation loop for configured to selectively direct anode outlet fluid to oxygen capture media;
wherein the purification unit is configured to reduce the amount of oxygen in an anode exhaust stream exiting the anode outlet prior to the anode exhaust stream being directed to the anode inlet, the reduction being performed after shut-down, before start-up and during the start-up;
wherein the purification unit is an oxygen scavenging system (300);
wherein the purification unit contains a regenerable oxygen capture media configured to at least one of adsorb and absorb oxygen; and,
wherein the oxygen reduction before start-up reduces increase in localized anode potential by about 0.5V, across the electrode surface of the at least one fuel cell.

3. The fuel cell system of claim 2, wherein the media includes an oxygen removing catalyst.

4. The fuel cell system of claim 2, wherein the oxygen capture media is regenerated by stripping the media with a fluid containing at least hydrogen gas.

5. The fuel cell system of claim 2, wherein the heat for regenerating the oxygen capture media is provided by at least one electrical heater.

6. The fuel cell system of claim 2, wherein the oxygen capture media is regenerated by heating the media with a catalytic heater element (55) configured to combust hydrogen gas.

7. The fuel cell system of claim 6, wherein the catalytic heater element is in thermal communication with the purification unit.

8. The fuel cell system of claim 1, wherein the oxygen capture media contains at least one of nickel, copper, zinc oxide and carbon.

9. The fuel cell system of claim 3, wherein the catalyst contains at least one member of the group consisting of palladium, platinum, ruthenium, rhodium, osmium, iridium gold, silver, rhenium, iron, chromium, cobalt, copper, manganese, tungsten, niobium, titanium, tantalum, lead, indium, cadmium tin, bismuth and gallium.

10. The fuel cell system of claim 3, wherein the selected catalyst or alloy forming the catalyst is configured to combust hydrogen at temperatures as low 0° C.

11. The fuel cell system of claim 3, wherein the selected catalysts or alloy forming the catalyst is configured to combust hydrogen at temperatures as low −30° C.

* * * * *